May 24, 1966  M. A. BRONZERT  3,252,183
CHANNELLED EXTRUSION DIE
Filed Jan. 8, 1964

INVENTOR.
M. A. BRONZERT
BY
*S. Gundersen*
ATTORNEY

United States Patent Office 3,252,183
Patented May 24, 1966

3,252,183
CHANNELLED EXTRUSION DIE
Melvin A. Bronzert, Baltimore, Md., assignor to Western Electric Company, Incorporated, New York, N.Y., a corporation of New York
Filed Jan. 8, 1964, Ser. No. 336,585
2 Claims. (Cl. 18—13)

This invention relates to an extrusion die having channels formed therein for directing extruded material to the forming area adjacent the exit of the die.

In the manufacture of telephone drop wire, insulation is extruded about a pair of spaced conductors wherein the insulation has an elongated, oval cross section with a major and a minor dimension. The product forming land area of the extrusion die used heretofore was formed with a major and minor dimension to provide the desired configuration of insulation about the spaced conductors. However, due to the different dimensions in the land area of the die, it was difficult to control both dimensions of the extruded product. This difficulty occurred when the material being extruded passed through the oval-shaped land area, wherein a control of the minor dimension resulted in a deficiency of material along the extremities of the major dimension and a control of the material along the major dimension resulted in a surplus of material along the minor dimension extremities. Hence, in order to insure adequate dimensioning along both dimensions, the land area of the die was formed oversize along the major dimension. In this manner, the minor dimension was controllable but the major dimension varied from a required dimension to a dimension which was in excess of that required. Due to the considerable volume of product manufactured, the excess material required to insure at least proper dimensioning of the completed product resulted in a costly operation.

It is, therefore, an object of this invention to provide a new and improved extrusion die which supplies adequate extrudable material at the extremities of the major dimension of an oval-shaped land area of the die to obtain desired dimensions of the completed extruded product.

With this and other objects in view, the present invention contemplates an extrusion die formed with an oval land area surface having a major and minor dimension for forming material being extruded therethrough and means formed in the die for providing additional material along the extremities of the major dimension of the land area adjacent an exit port of the die to insure an adequate supply of material in this area for proper dimensioning of the completed product.

Other objects and aspects of the present invention will become more readily understood from the following detailed description of a specific embodiment thereof, when read in conjunction with the appended drawings, in which.

Figure 4:
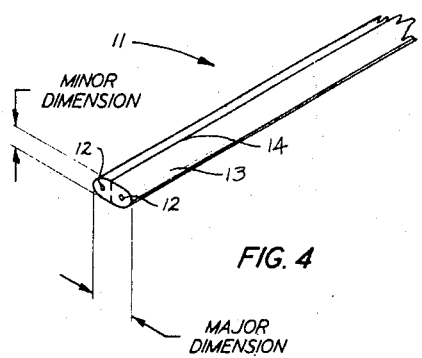
FIG. 4 is a perspective view of the product manufactured by using the system, as shown in FIG. 1, in accordance with the principles of the invention.

Referring to FIG. 4, a telephone drop wire 11 is provided with a pair of parallel spaced wires 12 having an insulation material 13 surrounding the wires. In addition, slits 14 are formed on opposite sides of the insulation to facilitate separation of the spaced wires 12 when such separation is required. It is noted that the insulation material 13 assumes an oval shape having a major dimension and a minor dimension.

Figure 1:
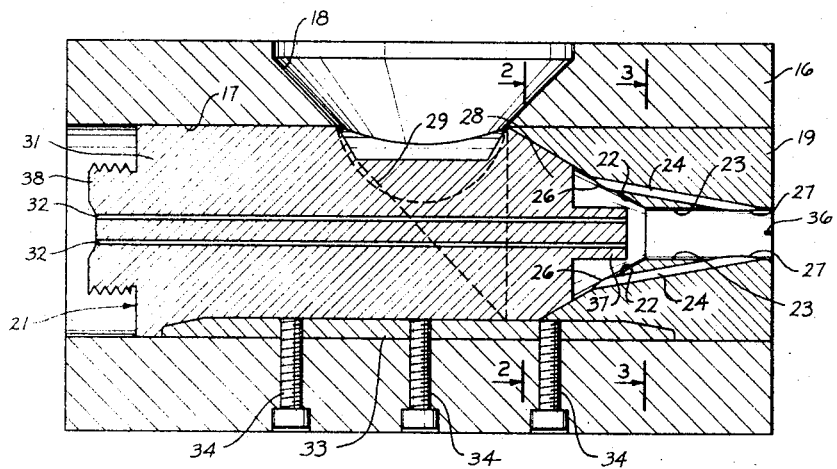
FIG. 1 is a sectional view showing a die and a core tube inserted into an extruder head in accordance with the invention.
Figure 2:
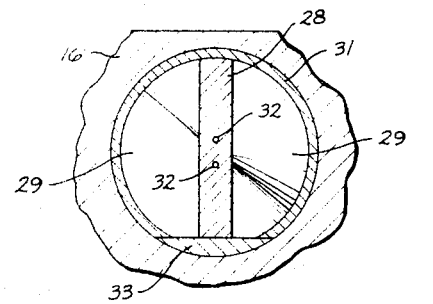
FIG. 2 is a partial sectional view, taken along line 2—2 of FIG. 1, showing portions of the core tube.
Figure 3:
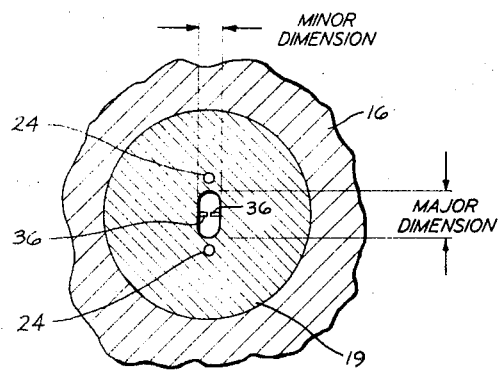
FIG. 3 is a partial sectional view, taken along line 3—3 of FIG. 1, showing a section of the die.

As shown in FIG. 1, an extruder head 16 is attached to an extruder (not shown), and is formed with a bore 17 which extends therethrough and communicates centrally with a tapered spew 18 for directing extrudable material from the extruder into the bore. A die 19 is positioned in the forward end of the bore 17 of the extruder head 16, and a core tube 21 is positioned within the bore behind the die 19. The die 19 is provided with an approach-area surface 22 in the inner rearward portion thereof, and tapers toward and is contiguous with an oval-shaped land-area surface 23 formed within the inner forward portion of the die. In addition, the die is formed with a pair of channels 24 which have entry ports 26, respectively, on opposite sides of an intermediate portion of the approach-area surface 22 and exit ports 27, respectively, formed on opposite sides of a forward portion of the land-area surface 23. The core tube 21 is formed with a forward tapered end 28, which engages partially the tapered approach-area surface 22 of the die 19. Further, the tapered end 28 of the core tube 21 is formed with a substantially rectangular cross section, as shown in FIG. 2, which extends from bevelled surfaces 29 of a rearward, substantially circular, cross-sectioned portion 31 of the core tube. The core tube 21 is centrally formed with a pair of parallel spaced openings 32 to facilitate the passage of the spaced wires 12 therethrough and into the land area of the die 19 during an extruding operation. A bottoming plate 33 is positioned within cavities formed in the die 19 and the core tube 21, and is held in place by a plurality of fastening members 34 which extend through a portion of the extruder head 16. A shown in FIG. 3, the oval-shaped land-area surface 23 of the die 19 is formed with a major dimension and a minor dimension, which conform with the desired major and minor dimensions, respectively, of the completed product 11. In addition, the die 19 is formed with a pair of opposed projections 36 which extend centrally from opposite sides of the land-area surface 23 along the minor dimension and facilitate the forming of the slits 14 in the finished product. It is noted, as shown in FIG. 1, that the core tube 21 is formed with a reduced forward extension 37 which facilitates the guiding of the pair of spaced wires 12 into the land area of the die 19, and further that the core tube is formed with a threaded, rearward, reduced portion 38 to facilitate the removal of the core tube subsequently to the extruding operation.

In the past, the extrusion system, as shown in FIG. 1, was utilized to manufacture the product 11 without the aid of the channels 24. The insulation material 13, in an extrudable state, was extruded from the extruder (not shown) through the spew 18 and into communication with the bevelled surfaces 29 of the core tube 21, whereafter the material was directed through the approach and land areas of the die 19 to form about and between the spaced parallel wires 12 passing therethrough. During this process, it was noted that only one of the two dimensions of the oval-shaped product could be controlled. For example, if the land-area surface 23 of the die 19 was formed in accordance with the desired major and minor dimensions, the material being extruded through the die satisfied the minor dimension but was insufficient to fill in the extremities of the major dimension of the land area, thereby resulting in a product which was deficient in material along the extremities of the major dimension. In an attempt to overcome this problem, additional pressure was applied through the extruding system to force the material into the major dimension extremities of the land area of the die 19. However, the application of additional pressure resulted in an undesirable expansion of insulating material 13 along the extremities of the minor dimension as the product 11 exited from the die 19. In a further attempt to reach a solution to the problem, the major dimension of the die was extended to insure the application of sufficient material at the extremities of the major dimension, thereby providing the product 11 having at least sufficient insulating material 13 extruded about the wires 12 to satisfy the dimension requirements. While the results of the last-mentioned solution were satisfactory, the product 11 manufactured thereby usually had a minor dimension in accordance with desired requirements but had a major dimension which was in excess of the requirements and was necessitated to insure the manufacture of product which would pass dimensional requirements. Hence, it is seen that the utilization of this method resulted in excess material being applied to the completed product 11 at the major dimension extremities, wherein such excess material served no purpose where the insulating requirements of the product were concerned. In view of a sizeable volume of product 11 manufactured periodically, the operation of applying the excess material along the major dimension extremities became quite costly.

As a result of additional study into this problem, it was discovered that, by forming the channels 24 in the die 19, additional amounts of insulating material 13 could be extruded, under normal extruder pressure application, from the approach area directly to the forward portion of the land area of the die along the extremities of the major dimension, thereby insuring the application of sufficient material in the land area as the completed product 11 exits from the die 19. As the material 13 flowing from the bevelled surfaces 29 is directed into the approach area of the die 19, portions of the material flow into the channels 24 through the entry ports 26 and from the channels into the land area of the die through the exit ports 27 to provide the additional material required to insure the application of adequate material at the major dimension extremities. In this manner, normal pressures are maintained and the major and minor dimensions of the land-area surface 23 correspond to the respective major and minor dimensions of the completed product 11, whereby no compensations in these dimensions are necessitated to provide a desirable completed product.

It is to be understood that the above-described arrangement is simply illustrative of the principles of the invention. Other arrangements may be devised by those skilled in the art which will embody the principles of the invention and fall within the spirit and scope thereof.

What is claimed is:

1. An extrusion die utilized in an extruding system for extruding a material in a desired configuration, which comprises:
    an approach-area surface formed within the inner, rearward portion of the die,
    a land-area surface formed within the inner, forward portion of the die contiguous with the approach area and having an oval configuration with a major and a minor dimension, the approach-area surface of the die being tapered from a rearward opening in the die to the rearward portion of the land area, and
    a pair of channels formed in opposite sides of the die having entry ports formed in opposite sides of an intermediate portion of the approach area and respective exit ports formed in a forward portion of opposite sides of the land area along the major dimension thereof adjacent the exit port of the die so that the extrudable material fed into the entry port of the die moves through the approach and land areas to form the completed product in substantially the desired configuration and additional amounts of the material are fed into the entry ports and out of the exit ports of the channels whereby additional material is applied in the land area along the extremities of the major dimension to insure adequate material along the major dimension of the completed product.

2. In an extrusion system wherein a core tube having a pair of parallel spaced openings are aligned with a common opening of the extrusion die in an extruder head for receiving a pair of parallel spaced wires therethrough, the die having an approach-area surface in the inner, rearward portion tapering downwardly toward and contiguous with an oval land-area surface in the inner, forward portion of the die, wherein the land area is formed with a major and a minor dimension whereby material is extruded into the approach area and through the land area to form the material about and between the spaced parallel wires passing through the die having a major and a minor dimensional configuration substantially similar to the land area of the die, the improvement which comprises:
    a pair of channels having entry ports formed on opposite sides of an intermediate portion of the approach area and exit ports formed on opposite sides of a forward portion of the land area at the extremities of the major dimension whereby portions of the material are extruded through the channels and into the forward portion of the land area at the extremities of the major dimension to insure an adequate supply of the extrudable material in these extremities as the completed product exits from the extrusion die.

References Cited by the Examiner

UNITED STATES PATENTS

| 2,105,812 | 1/1938 | Gordon et al. | 18—13 X |
| 2,149,002 | 2/1939 | Wermine | 18—13 X |
| 2,659,932 | 11/1953 | McNanee | 18—13 |
| 2,766,480 | 10/1956 | Henning | 18—13 X |

WILLIAM J. STEPHENSON, *Primary Examiner.*

L. S. SQUIRES, *Assistant Examiner.*